Patented June 23, 1925.

1,543,154

UNITED STATES PATENT OFFICE.

CLARENCE R. FOX AND WILLIAM S. DAVIS, OF LEBANON, PENNSYLVANIA.

PROCESS OF DISPOSING OF GARBAGE.

No Drawing. Application filed July 28, 1923. Serial No. 654,500.

*To all whom it may concern:*

Be it known that we, CLARENCE R. FOX and WILLIAM S. DAVIS, citizens of the United States, residing at Lebanon, in the county of Lebanon and State of Pennsylvania, have invented certain new and useful Improvements in Processes of Disposing of Garbage, of which the following is a specification.

This invention relates to a process of disposing of garbage, and more particularly to a method of disposing of garbage by putrefaction.

An object of the invention is to provide a method of disposing of garbage whereby the costly and undesirable process of incineration is avoided.

It is the general practice at the present time in large cities to collect garbage and convey it to an incinerating plant where it is burned. The incinerating process is a costly one requiring a great deal of labor and the consumption of a large amount of fuel. It is very objectionable in that an incinerating plant gives off disagreeable odors and is a nuisance to the neighborhood in which it is located.

In practicing the process forming the subject matter of the present invention, the garbage and other refuse is ground to the proper size to facilitate putrefaction. It is then putrefied in tanks of the type of Imhoff or septic tanks where the liquid and solids separate and the sludge formed is removed at intervals after it has become entirely putrefied. This sludge may be further dried and then used for fertilizer.

We are aware of several prior patents suggesting the disposal of garbage by grinding and then discharging it into a sewerage system, but in so far as we are aware, we are the first to grind garbage to a finely divided condition to insure complete putrefaction. In the patents of the prior art disclosing the idea of grinding garbage, the grinding is resorted to merely for the purpose of reducing the garbage to a proper condition to permit its passage through a sewer pipe.

In a typical embodiment of the invention, the garbage is collected in the usual manner and conveyed to a central point where the grinding or crushing apparatus is located. Any type of grinding machine which will reduce the garbage and other refuse to a finely divided state may be employed. From the grinding machine, the ground garbage is then conveyed to the putrefying tanks. The grinding machine may be located adjacent the tanks and the ground material fed directly into the tanks, or the material may be conveyed after grinding through the ordinary sewer pipes of a city to the sewerage disposal plant in a city where the sewerage is disposed of by putrefaction and treated in the tanks forming a part of the sewerage system. The action of the ground garbage in the putrefying tanks is similar to the action of sewerage disposal. As stated, any type of tank, such as the ordinary septic tank or an Imhoff tank may be employed. The garbage in its divided condition is fed into the tank and the solids separate and enter the sludge chamber at the bottom. The liquid effluent is discharged from the top of the tank in the usual manner and passed over suitable filter beds into a stream or other body of water. The solid matter is allowed to remain in the tank until putrefaction is complete. While the period of putrefaction may vary, we have found in actual practice that a period of about six months is sufficient to cause complete putrefaction of the solid matter. At the end of six months, the sludge formed is tapped from the bottom of the tank at intervals and dried in any suitable manner as by allowing it to form in a bed or on the adjacent surface and dried under the effects of the sun. The dried material may then be employed for fertilizer.

Disposal of garbage in this manner is not accompanied by disagreeable odors and a plant of this character may be conducted at a minimum expense after the initial installation. The cost of the tanks forming a part of the apparatus is less than the cost of an incinerating plant, the labor incident thereto is much less, and the use of fuel is eliminated.

While we have described in detail the preferred practice of the process, it is to be understood that the details of procedure may be widely varied without departing from the spirit of the invention or the scope of the subjoined claim.

Having thus described our invention, we claim:

The process of disposing of garbage which comprises reducing it to fine particles by mechanical means, and then passing the finely divided garbage through a sewerage putrefaction system to putrefy it.

In testimony whereof, we affix our signatures in presence of two witnesses.

Dr. CLARENCE R. FOX.
WILLIAM S. DAVIS.

Witnesses:
E. E. McCurdy,
E. Blanche Gingrich.